(12) United States Patent
Yoshida et al.

(10) Patent No.: US 6,473,372 B2
(45) Date of Patent: *Oct. 29, 2002

(54) DISC CHANGER FOR A DISC PLAYER

(75) Inventors: Susumu Yoshida; Toru Suzuki; Tomomichi Kimura; Kenjiro Ido; Takashi Mizoguchi; Kenji Uchiyama, all of Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,559

(22) Filed: Apr. 15, 1999

(65) Prior Publication Data

US 2001/0026526 A1 Oct. 4, 2001

(30) Foreign Application Priority Data

Apr. 17, 1998 (JP) .............................. 10-107266

(51) Int. Cl.⁷ .......................... G11B 17/22; G11B 17/04
(52) U.S. Cl. .................. 369/30.9; 369/30.92; 369/77.1
(58) Field of Search .............................. 369/34, 36, 38, 369/75.1, 75.2, 77.1, 77.2, 178, 179, 191, 192, 201, 202, 205, 206, 30.85, 30.9, 30.92; 360/92, 98.04, 98.06, 99.06, 99.07

(56) References Cited

U.S. PATENT DOCUMENTS

| | | | | |
|---|---|---|---|---|
| 5,255,255 A | * | 10/1993 | Kaneda et al. | 369/77.1 |
| 5,970,042 A | * | 10/1999 | Fujimoto et al. | 369/247 |
| 6,028,831 A | * | 2/2000 | Scholz et al. | 369/75.2 |
| 6,157,607 A | * | 12/2000 | Nakamichi | 369/191 |
| 6,222,816 B1 | * | 4/2001 | Yoshida et al. | 369/247 |

FOREIGN PATENT DOCUMENTS

| | | | |
|---|---|---|---|
| EP | 0391424 A2 | | 10/1990 |
| JP | 5135475 | * | 6/1993 |
| JP | 411066677 A | * | 3/1999 |

* cited by examiner

Primary Examiner—William Klimowicz
(74) Attorney, Agent, or Firm—Arent Fox Kintner Plotkin & Kahn

(57) ABSTRACT

A disc storage stores a plurality of discs. A pair of driving rollers are provided for carrying a disc inserted from an opening to the disc storage. Each of the driving rollers is provided to be moved between a disc carrying position and a retracted position by a moving device.

9 Claims, 17 Drawing Sheets

DISC CHANGER FOR A DISC PLAYER

BACKGROUND OF THE INVENTION

The present invention relates to a device for reproducing an optical disc selected from a plurality of discs stored in a disc storage, and more particularly to a disc reproducing device mounted on a motor vehicle.

In recent years, a disc reproducing device in which a disc can be changed through an opening for inserting a disc to be reproduced has been proposed.

FIG. 20 shows a disc reproducing device, which was filed by the applicant and disclosed in Japanese Patent Application Laid Open 10-21628.

In the figure, the reference numeral 500 represents a driving roller, 501 is a disc storing section, 502 is a tray, 503, 504 are disc pulling out arms, 505, 506 are coil springs, and 507 is a disc discharging arm.

The driving roller 500 is driven by a motor (not shown) to carry a disc inserted passing through an opening to the disc storing section 501. In the disc storing section 501, a plurality of trays, each holding a disc, are arranged. A desired tray is located to a position corresponding to the driving roller 500 for changing the disc. There is provided a disc carrying device (not shown) between the disc storing section 501 and a disc reproducing section (not shown).

The disc pulling out arm 503 is rotatable about a shaft 503a and has a contact portion 503b to be contacted with a periphery of disc D, and urged in the clockwise direction by the spring 505. Similarly, the disc pulling out arm 504 is rotatable about a shaft 504a, has a contact portion 504b, and urged in the counterclockwise direction by the spring 506. The disc discharging arm 507 is located so as to be contacted with the disc.

Before the inserting of the disc, the arms 503 and 504 are located in positions A. When the disc is taken in by the driving roller 500, arms 503 and 504 are rotated to positions B. However, the arms 503 and 504 push the disc, thereby removing the disc from the driving roller 500 and inserting the disc in the tray 502. When discharging the disc, the discharging arm 507 is rotated to the position A to push the disc to the driving roller 500.

In the conventional device, arms 503, 504 and 507 must be provided in order to carry the disc. Therefore, the device is complicated in construction, which results in high manufacturing cost.

SUMMARY OF THE INVENTION

An object of the present invention is to provide a disc reproducing device which is simple in construction and has high reliability.

According to the present invention, there is provided a disc changer comprising, a disc storage in which a plurality of discs are stored in an arranged condition, a disc carrier having a pair of driving rollers for carrying a disc inserted from an opening to the disc storage, moving means for moving each of the driving rollers between a disc carrying position and a retracted position.

The driving rollers at the disc carrying position are provided to be engaged with discs in the disc storage, and to be parallel with the opening when positioned at the disc carrying position, and to be unparallel at the retracted position.

Each of the driving rollers is pivotally mounted on a supporting plate at a position adjacent the opening.

The disc storage has a plurality of trays arranged in a disc arranging direction, and is provided to be moved in the disc arranging direction, and further comprises a tray moving means for moving the trays in the disc arranging direction, the tray moving means is provided for positioning a desired disc at a height approximately equal to the height of the driving rollers.

The tray has a disc supporting plate, a pair of notches are formed in the disc supporting plate, the driving rollers are provided to be inserted in the notches at the disc carrying position.

A separating device is provided for separating adjacent trays from a desired tray.

These and other objects and features of the present invention will become more apparent from the following detailed description with reference to the accompanying drawings.

DETAILED DESCRIPTION OF THE PREFERRED EMBODIMENT

Figure 1:
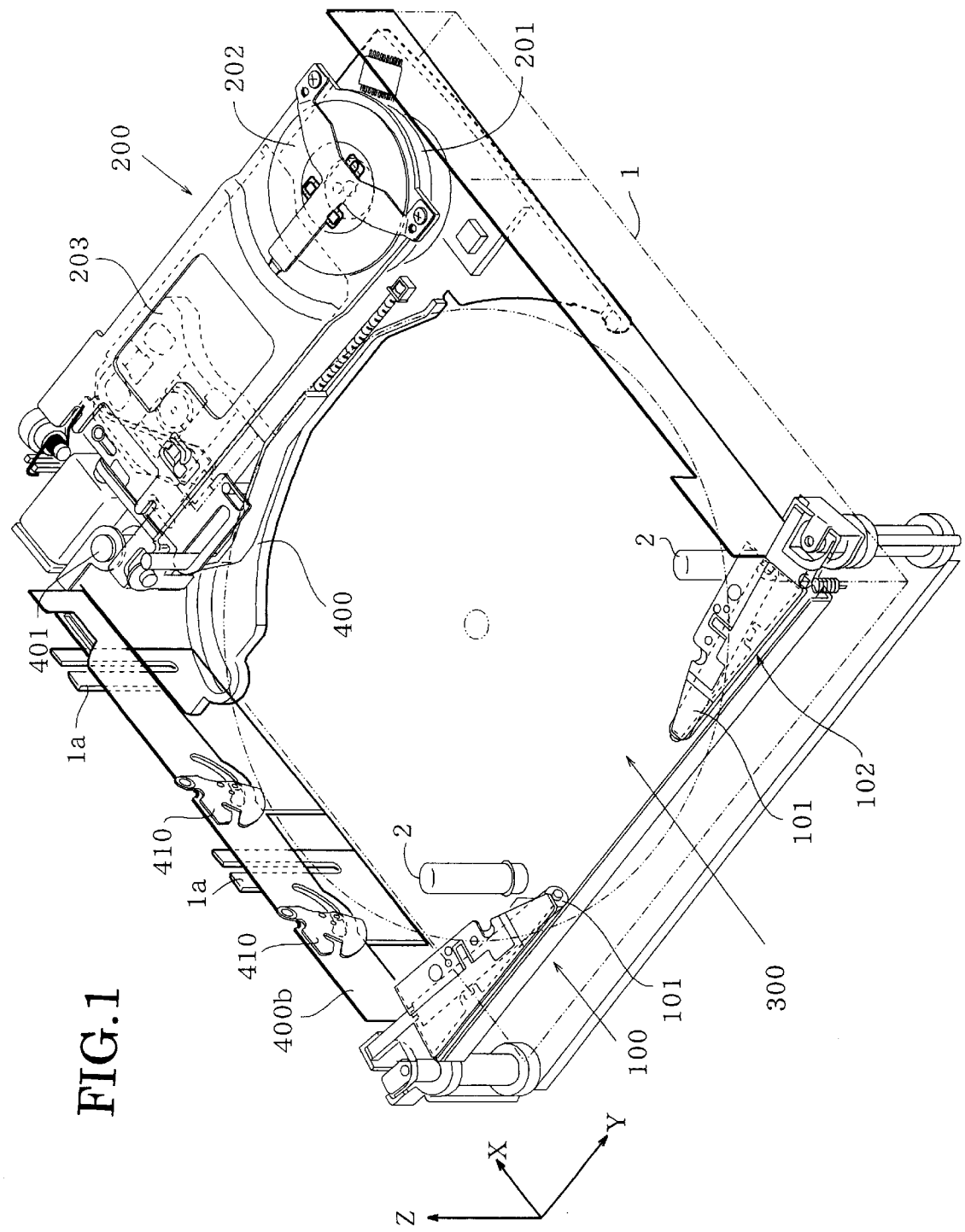
FIG. 1 is a perspective view of a disc changer according to the present invention.
Figure 2:
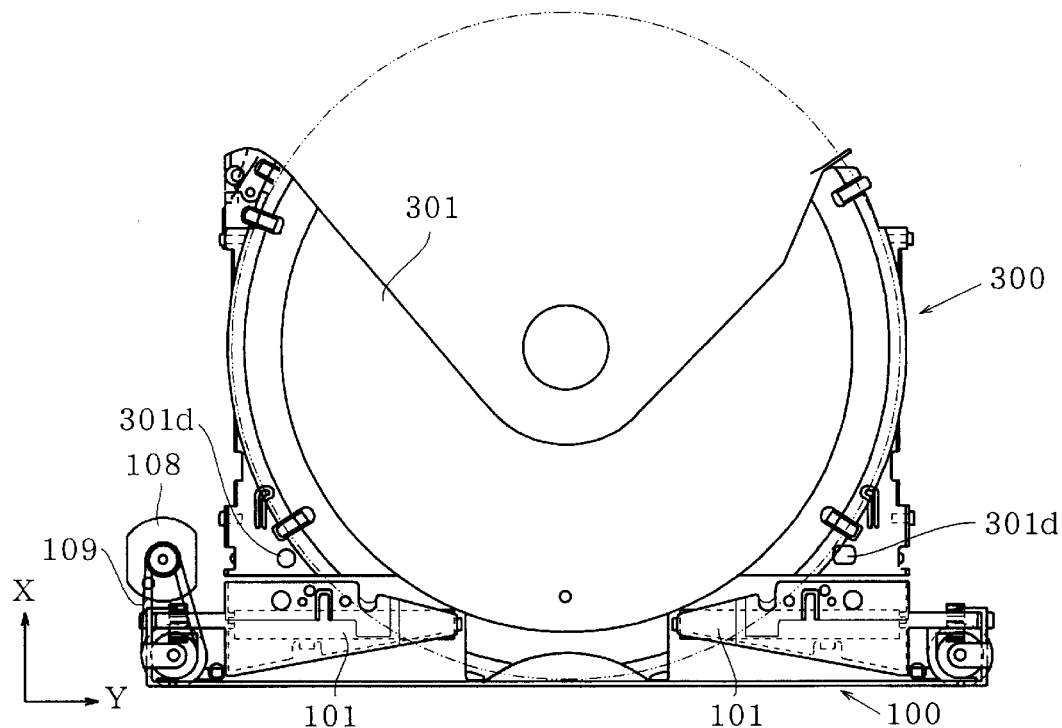
FIGS. 2a, 2b and 3 are plan views of a part of the disc changer.
Figure 2:
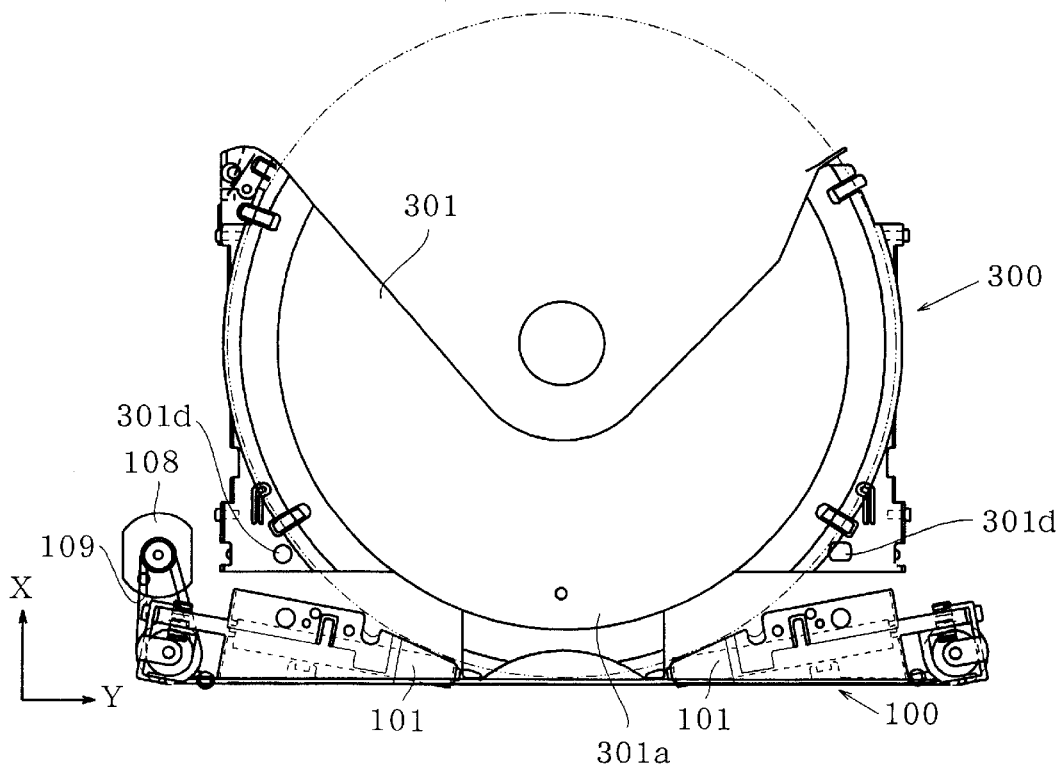

Referring to FIGS. 1, 2a and 2b showing the disc changer according to the present invention, main composition of the device comprises a disc carrier 100 having a pair of driving rollers 101, a disc player 200 having a turntable 201, clamper 202, pickup 203, a disc storage 300 having six trays 301 (FIG. 2) for arranging discs in the Z-direction and a tray moving mechanism having a movable plate 400 for moving the tray 301. These portions are provided in a chassis 1.

The disc carrier 100 is provided for carrying a disc inserted from an opening by a user to the disc storage 300, and for discharging the disc in the storage 300.

The driving rollers 101 are provided to contact with the underside of the inserted disc and to carry it in the X-direction.

Figure 3:
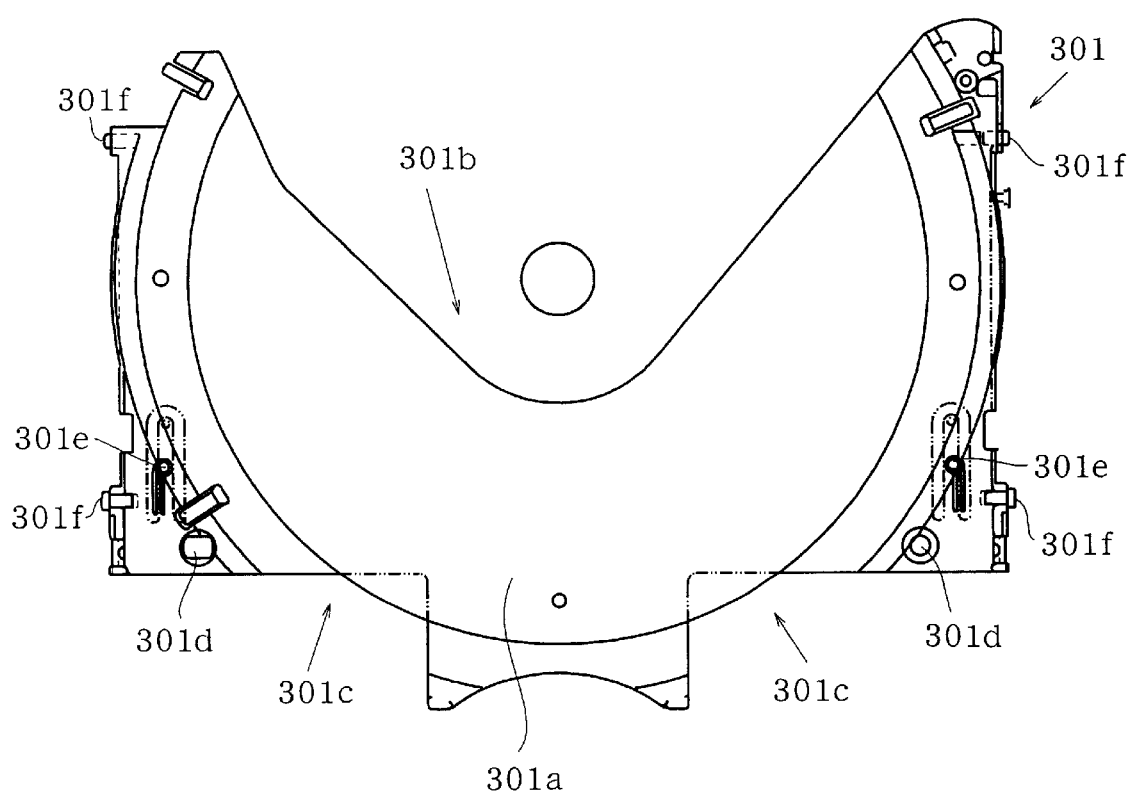

Referring to FIG. 3, the tray 301 has a disc supporting plate 301a having a V-shaped notch 301b and a pair of notches 301c. In the notch 301b, the turntable 201, clamper 202 and pickup 203 are inserted. Furthermore, the tray 301 has a pair of holes 301d in which guide shafts 2 are inserted, a pair of disc holding members 301e, four projections 301f.

Figure 4:
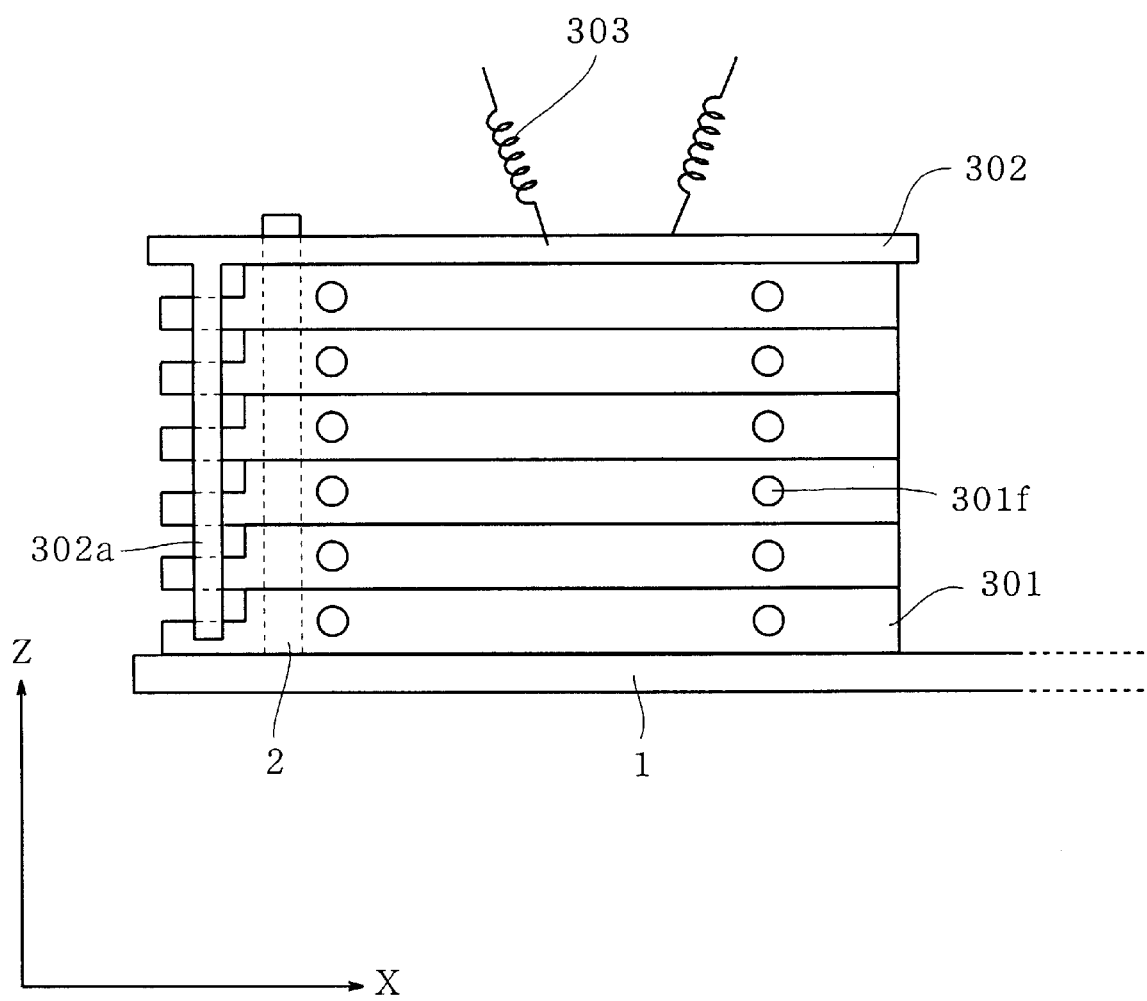
FIG. 4 is a side view of a tray stack.

As shown in FIG. 4, the shaft 2 is inserted in the holes 301d of six trays 301 and a hole of a regulating plate 302 on the stack of trays, thereby arranging the trays in the Z-direction. The regulating plate 302 is urged by springs 303 provided inside wall of the chassis 1 so that regulating plate 302 is prevented from upwardly moving. The regulating plate 302 has a vertical member 302a to hold the trays, thereby preventing the trays from moving in the Y-direction.

Figure 5:
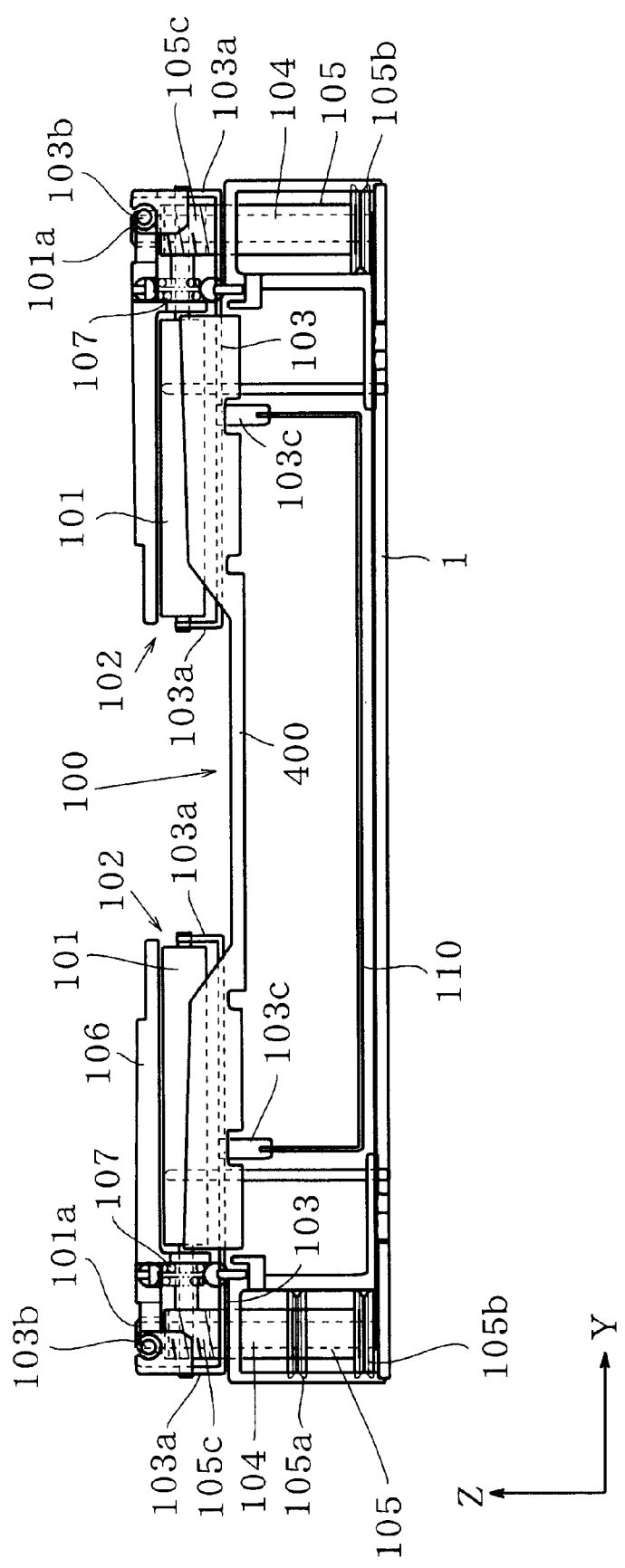
FIG. 5 is a front view of the disc changer.
Figure 6:
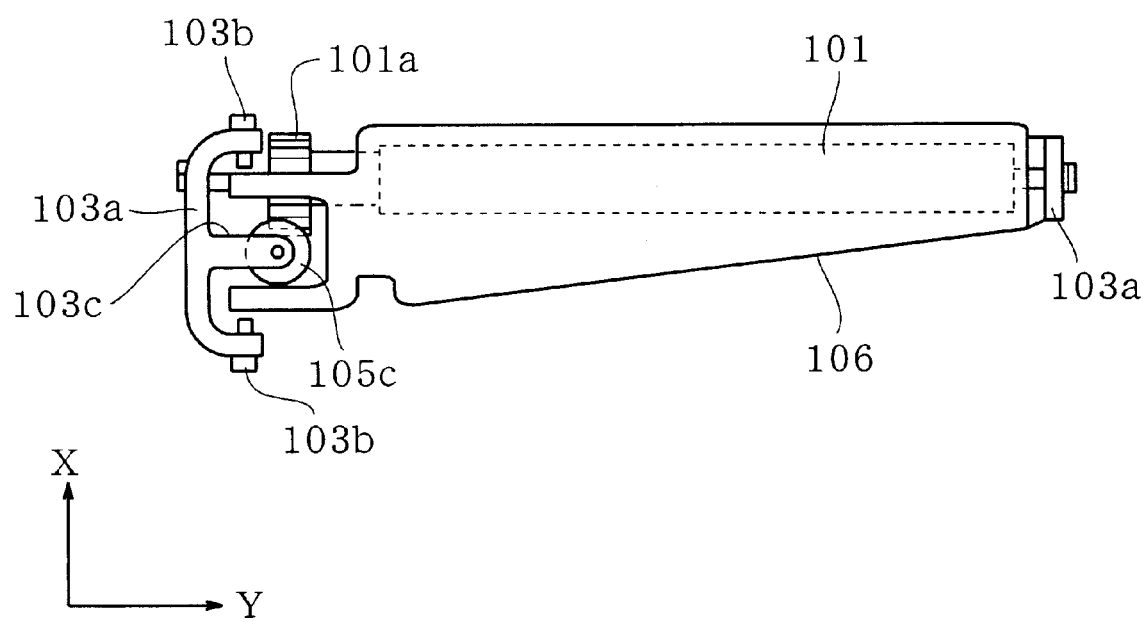
FIG. 6 is a side view of a driving roller.
Figure 7:
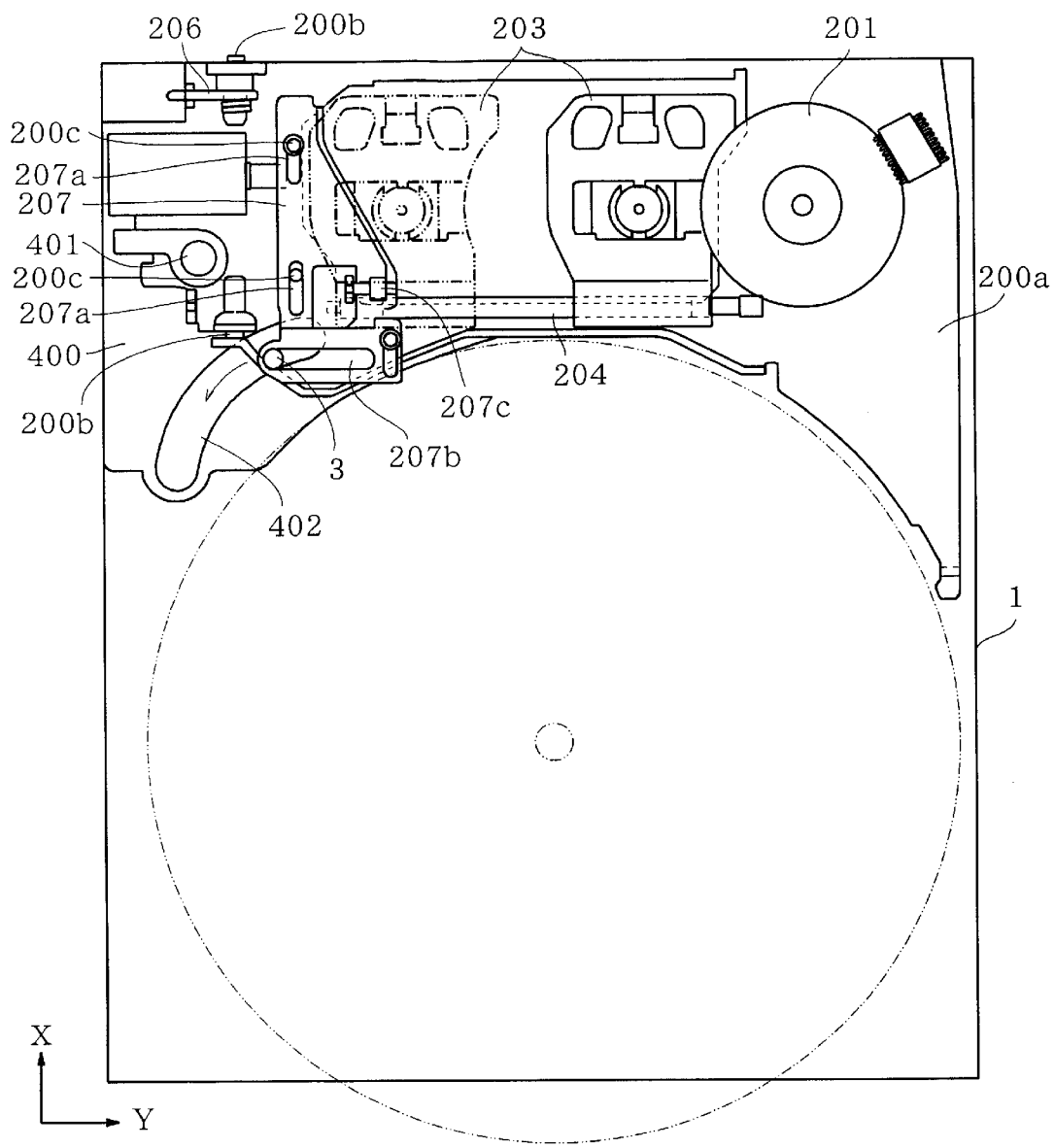
FIG. 7a is a plan view showing a disc player.
FIG. 7b is a plan view showing a clamper.
Figure 7:
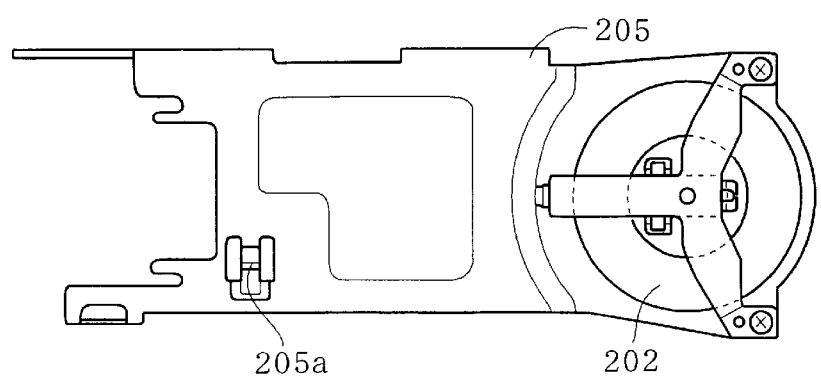
Figure 8:
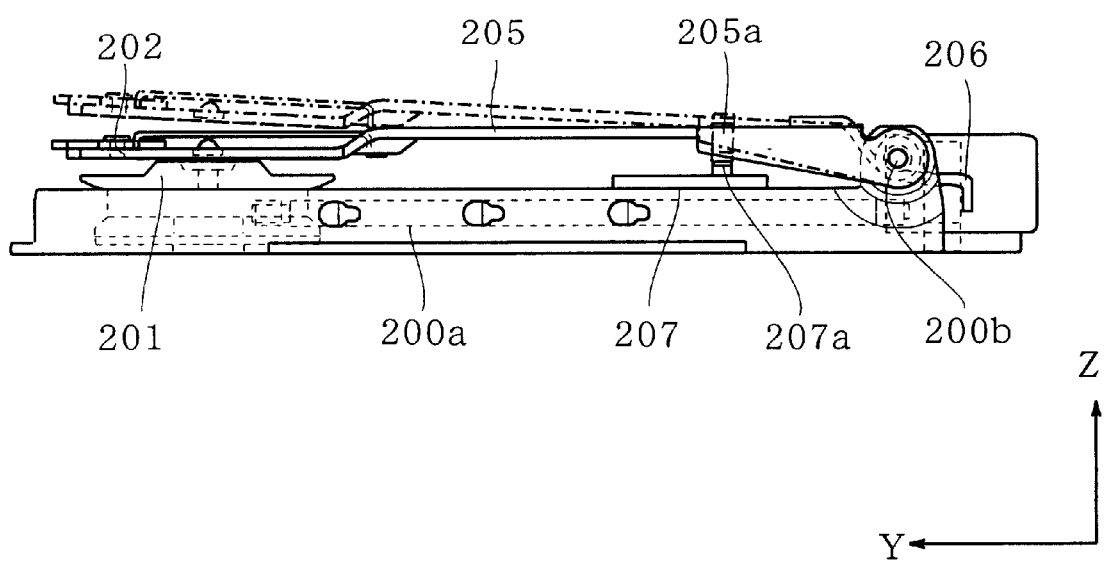
FIG. 8 is a side view showing a turntable.

Referring to FIGS. 5 and 6 showing the disc carrier 100, a worm wheel 101a is formed on a side of each driving roller 101. The driving roller 101 is rotatably mounted on an upright plate 103a of a supporting plate 103. A disc path regulating plate 106 is provided above the driving roller 101 and rotatably supported by a shaft 103b. Between the plate 106 and the driving roller 101, a disc carrying path 102 is formed. A coil spring 107 is provided between the regulating plate 106 and the supporting plate 103 to urge the plate 106 toward the driving roller 101.

A pair of rotatable shafts 105 are rotatably mounted on shafts 104. An upper portion of the rotatable shaft 105 is supported by the supporting plate 103 and a worm 105c is formed on an upper most portion of the rotatable shaft. The worm 105c is engaged with the worm wheel 101a of the driving roller 101. A pulley 105a is formed on one of the rotatable shaft 105, which pulley 105a engages with a belt 109 of a motor 108 (FIG. 2); Both rotatable shafts 105 have pulley 105b and are connected by a belt (not shown). Thus, both the shafts 105 are rotated by the motor 108 through the belts.

Each supporting plate 103 has a downwardly projecting projection 103c, passing through a hole formed in a movable plate 400. A movable member 110 is slidably mounted on the chassis 1 and engaged with the projection 103c. Therefore, when the movable member 110 moves in the X-direction, each of the plates 103 is rotated about the shaft 104 to rotate the driving roller 101 about the shaft 104.

Due to the above described construction, the driving rollers 101 are moved between a disc carrying position and a retracted position. FIG. 2a shows the driving roller 101 at the disc carrying position, and FIG. 2b shows the one at the retracted position.

When the driving rollers 101 are located at the disc carrying position, the rollers are inserted in the notches 301c as shown in FIG. 2a. At the positions, rollers are positioned in the Y-direction, where the rollers are parallel with the roller insertion opening and located on the disc mounted on the disc supporting plate 301a.

The driving rollers 101 at the retracted position are positioned outside the notches 301c as shown in FIG. 2b.

FIGS. 7a to 9 show the disc player 200 and the disc moving mechanism. On a base 200a of the disc player 200, there is provided the turntable 201, pickup 203, and pickup moving mechanism 204. The base 200a is rotatably supported by a shaft 401 on the movable plate 400. A clamper base 205 is rotatably supported by a shaft 200b on the base 200a and holds the clamper 202 at an end portion. A restriction portion 205a is formed on the clamper base 205. The clamper base 205 is urged to the base 200a by a spring 206 mounted on the shaft 200b.

On the base 200a, a clamp operation member 207 is provided. There is provided a pair of elongated holes 207a, an elongated hole 207b perpendicular with the holes 207a, and a roller 207c. In each hole 207a, engaged is a pin 200c projected from the base 200a, so that the member 207 is movable in the axis direction of a shaft 200b on the base 200a.

The movable plate 400 has an arcuated hole 402 in which a movable pin 3 is inserted. The pin 3 is further engaged with the elongated hole 207b. The pin 3 is moved in the arcuated hole 402 by a driving mechanism (not shown).

The movement of the pin 3 causes the movement of the disc player between the reproduction position and the retracted position and the disc clamping operation.

In FIG. 7a, the disc player 200 is at the retracted position, where the restriction portion 205a of the clamper base 205 is mounted on the roller 207c of the clamp operating member 207, thereby releasing the clamper 202 from the turntable 201.

When the pin 3 is moved in the direction shown by the arrow, the operating member 207 and base 200a are rotated about the shaft 401 in the clockwise direction. Thus, the disc player 200 is rotated to the reproduction position shown by dot and dash lines in FIG. 9.

Immediately before the reaching of the pin to the end of the arcuated hole 402, namely, immediately before the time when the disc player reaches the reproduction position, the driving direction of the pin 3 becomes parallel with the longitudinal direction of the elongated holes 207a of the operating member 207. Therefore, only the operating member 207 is moved in the longitudinal direction with respect to the base 200a, so that the restriction portion 205a of the base 205 removes from the roller 207c. As a result, the clamper 202 is pressed against the turntable 201 by the coil spring 206.

As described above, the disc clamp operation is carried out with the movement of the disc player 200 from the retracted position to the reproduction position, and the clamping is done at the same time as the positioning of the disc player 200 to the reproducing position. The clamp is released when the disc player moves from the reproduction position to the retracted position.

Figure 10:
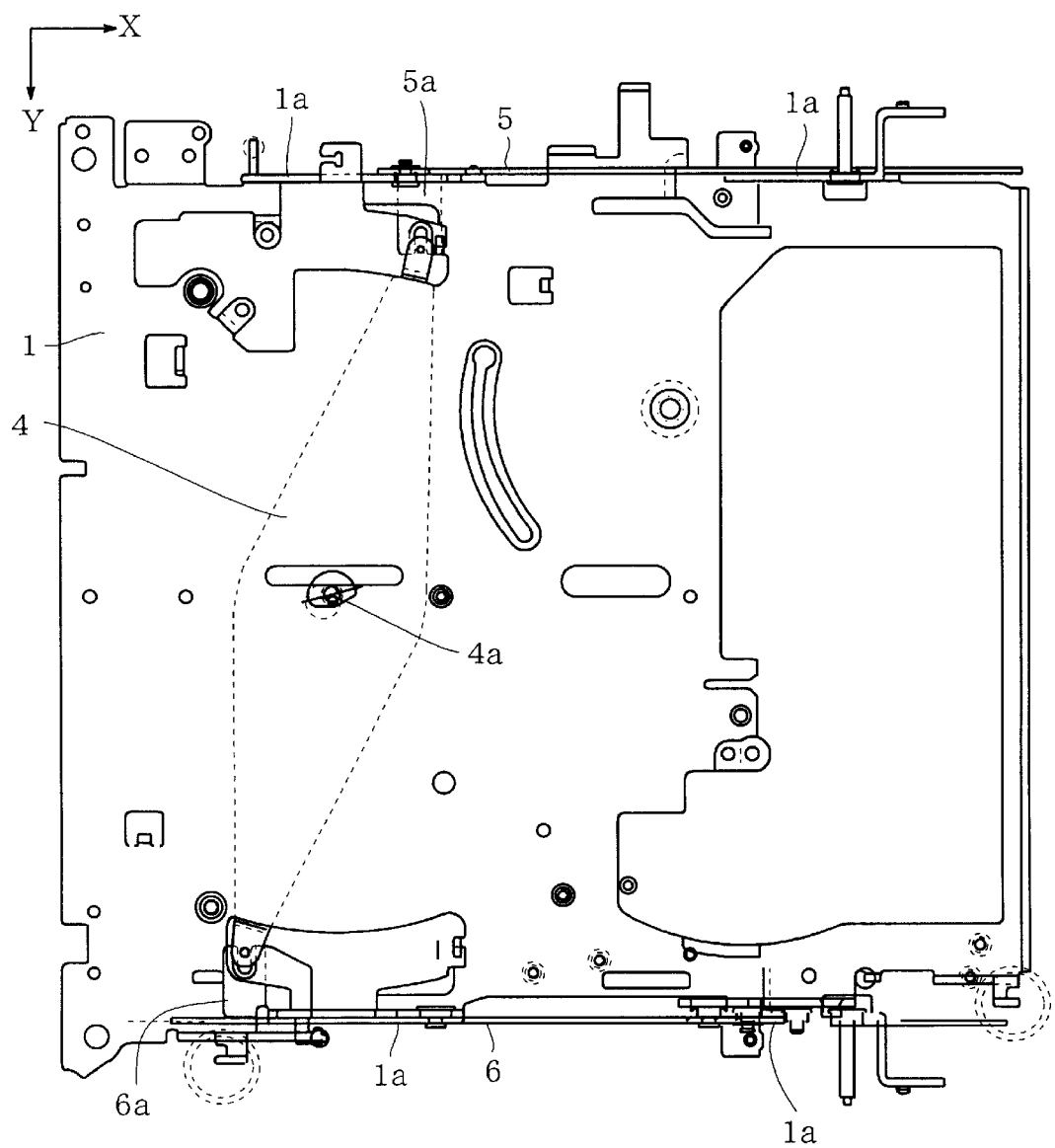
FIG. 10 is a plan view showing a chassis.

Referring to FIG. 10, an arm 4 is rotatably supported by a shaft 4a at the underside of the chassis 1. The arm is adapted to be pivoted by a motor (not shown).

Figure 11:
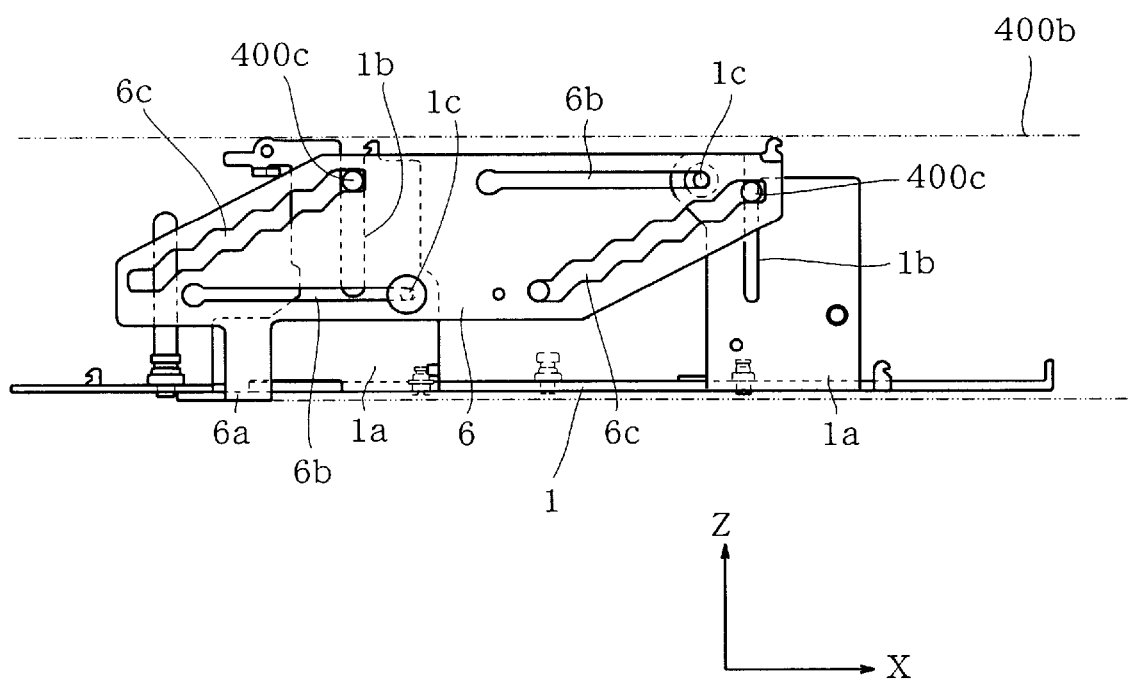
FIG. 11 is a side view showing a slide plate.

As shown in FIGS. 1, 10 and 11, a pair of vertical guide plates 1a are formed on both sides of the chassis 1, in the Z-direction. Slide plates 5 and 6 are slidably attached on the guide plates 1a. The slide plates 5 and 6 have projections 5a, 6a at the lower ends thereof, which projections are pivotally connected to both ends of the arm 4. Therefore, when the arm 4 is pivoted, the slide plates are moved in the opposite directions.

As shown in FIG. 11, the slide plate 6 has a pair of holes 6b in the X-direction, each of the holes 6b slidably engages with a pin 1c on the guide plate 1a. The slide plate has also the same holes as 6b. Each guide plate 1a has a vertical guide hole 1b in which slidably engaged is a pin 400c provided on a vertical plate 400b of the movable plate 400. Furthermore, the pin 400c is slidably engaged with a stepwisely inclined heaving hole 6c formed in the slide plate 6. The slide plate 5 has also heaving hole inclined in the reverse direction to the hole 6c. Thus, four pins 400c engage with the heaving holes and are moved in the Z-direction when the slide plates 5 and 6 moves in the X-direction, which causes the movable plate 400 to vertically move.

The heaving hole has six steps which corresponds to the six trays.

Figure 12:
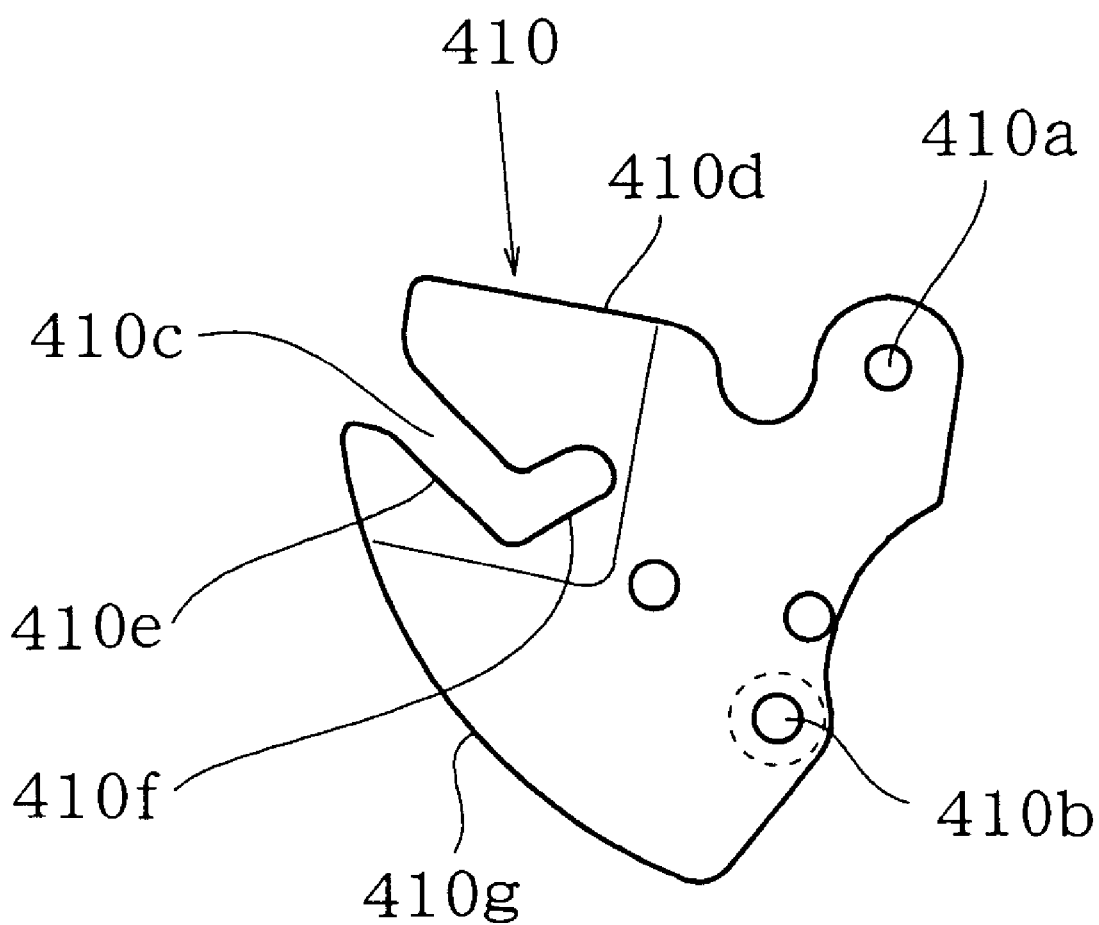
FIG. 12 is a side view showing a disc separating member.

FIG. 12 shows one of four tray moving members 410 which are pivotally mounted on the vertical plate 400b at a shaft 410a. A projection 410b is slidably engaged with an arcuated groove 400d formed in the vertical plate 400b. The tray moving member 410 has an L-shaped hole 410c in which a projection 301f (FIG. 3) of the tray 301. There is formed four cams 410d, 410e, 410f and 410g which are engaged with the projections 301f.

The operation of the device will be described hereinafter with reference to FIGS. 13 through 19. FIGS. 13 through 17 show the operation for mounting a disc inserted from the opening on the tray 301 of the disc storage 300. The operation is described about the mounting of the inserted disc on the second tray from the lower most tray.

Figure 13:
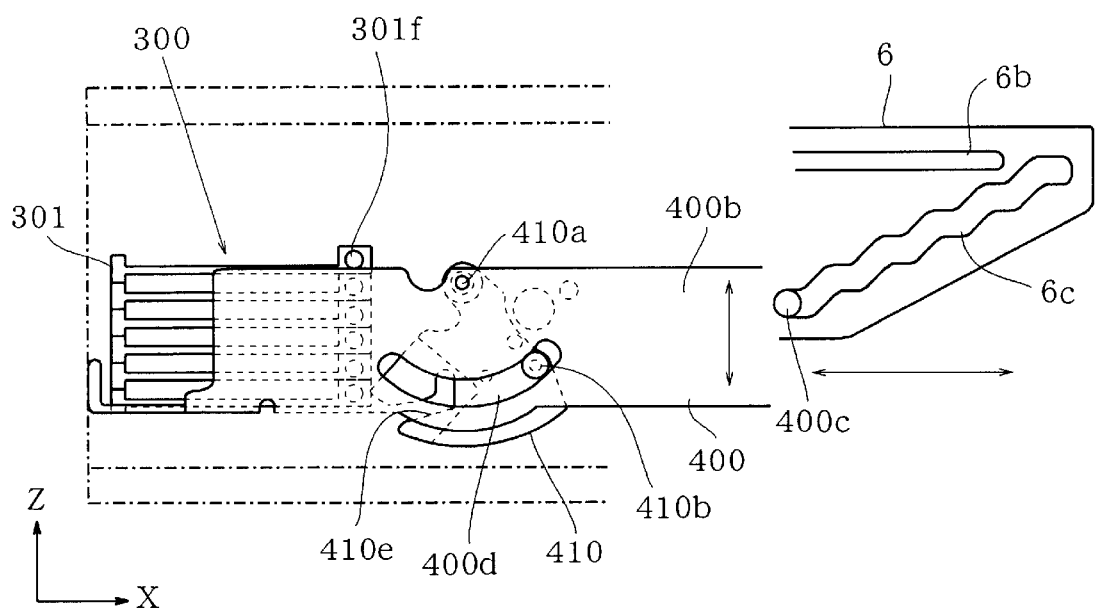
FIGS. 13 to 19 are side views showing the operation of the disc changer.

FIG. 13 shows a waiting state. In the state, all trays are stacked up. The pin 400c is mounted on the lower most step of the inclined hole 6c, and the movable plate 400 is positioned at the lower most position. The tray moving member 410 is retracted from the tray 310 so that the tray moving member does not strike the tray when the movable plate 400 moves.

Figure 14:
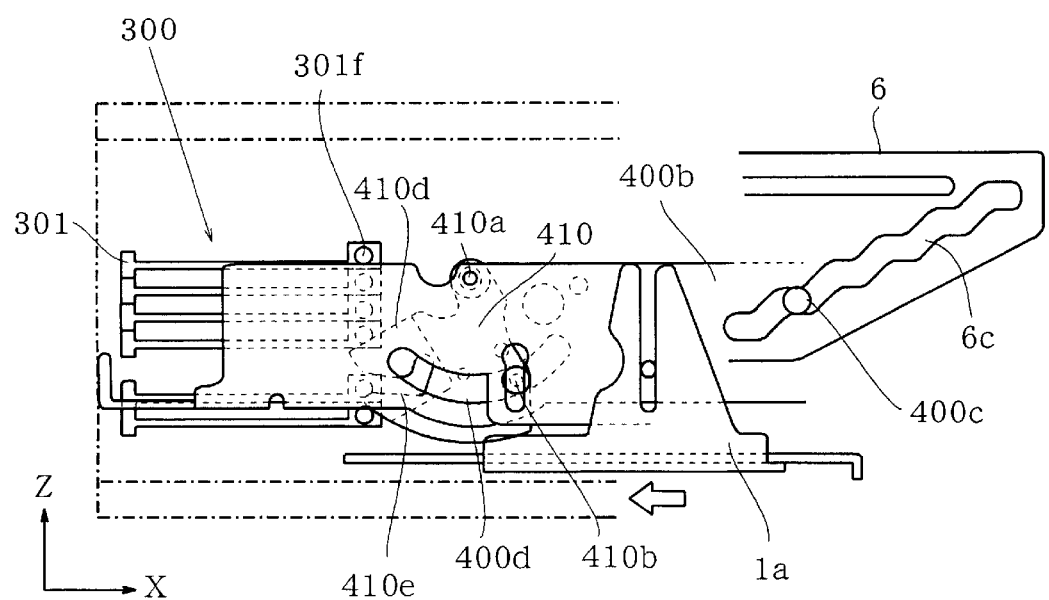

When the user inserts a disc in the opening, the slide member 6 is moved to the left and the slide member 5 is moved to the right by the arm 4 to raise the movable plate 400. When the pin 400c reaches the second step as shown in FIG. 14, the slide member 6 (the description about the slide member will be omitted hereinafter) stops to stop the movable plate 400. At the position, the tray moving member 410 holds the second tray 301, engaging with the underside of the tray.

More particularly, the tray moving member 410 is rotated in the clockwise direction, so that the cam 410d raises the projection 301f of the third tray, thereby lifting the third through sixth trays.

On the other hand, the projection 301f of the second tray mounts on the cam 410e and enters the hole 410c. Thus, the second tray is held by the tray moving member 410.

Next, the slide member 6 is moved to the left to lift the movable plate 400. Therefore, the third to sixth trays are raised by the cam 410d, and the second tray is raised by the cam 410e, leaving the first tray.

Figure 15:
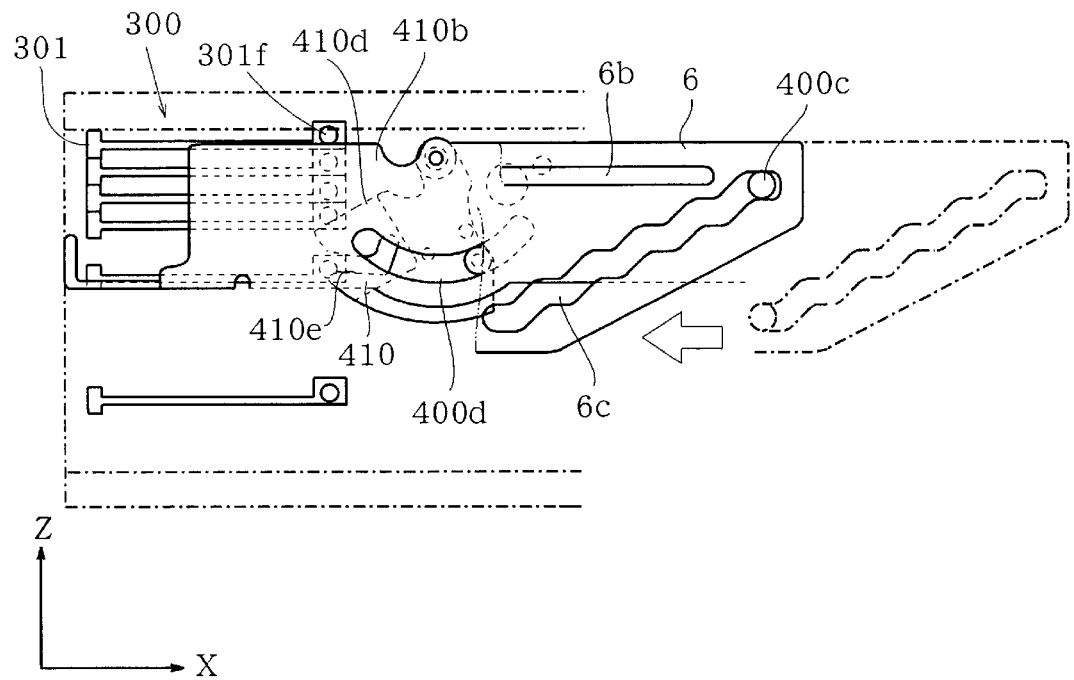

As shown in FIG. 15, when the pin 400c reaches the upper most step, the slide member 6 stops. The second tray held by the tray moving member 410 is placed at a position corresponding to the upper most tray position before the lifting shown in FIG. 13. This position corresponds to the position of the driving roller 101 of the disc carrier 100 (FIG. 5), where the insertion and discharge of the disc are performed at the height.

Figure 16:
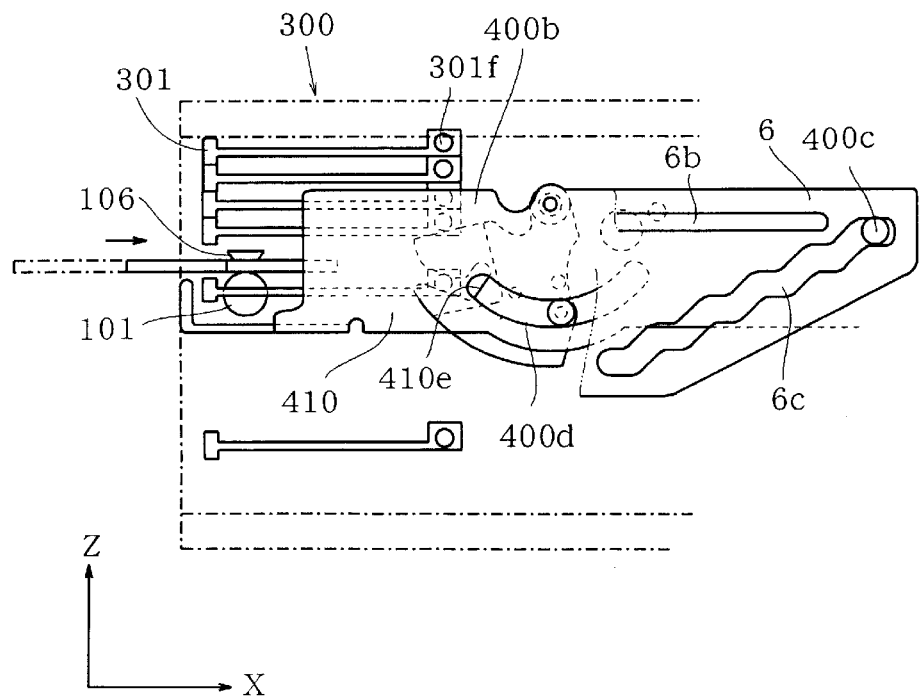

As shown in FIG. 16, the tray moving member 410 is slightly rotated in the clockwise direction, so that the third through sixth trays are raised by the cam 410d although the second tray is not raised. Thus, there is formed a space above the second tray, in which space the driving roller 101 can be inserted. Therefore, the driving roller 101 is moved from the retracted position (FIG. 2b) to the disc carrying position (FIG. 2a).

Thereafter, the driving roller 101 is driven so that the disc inserted by the user is carried. When the disc reaches the second tray, the driving roller 101 is stopped.

Figure 17:
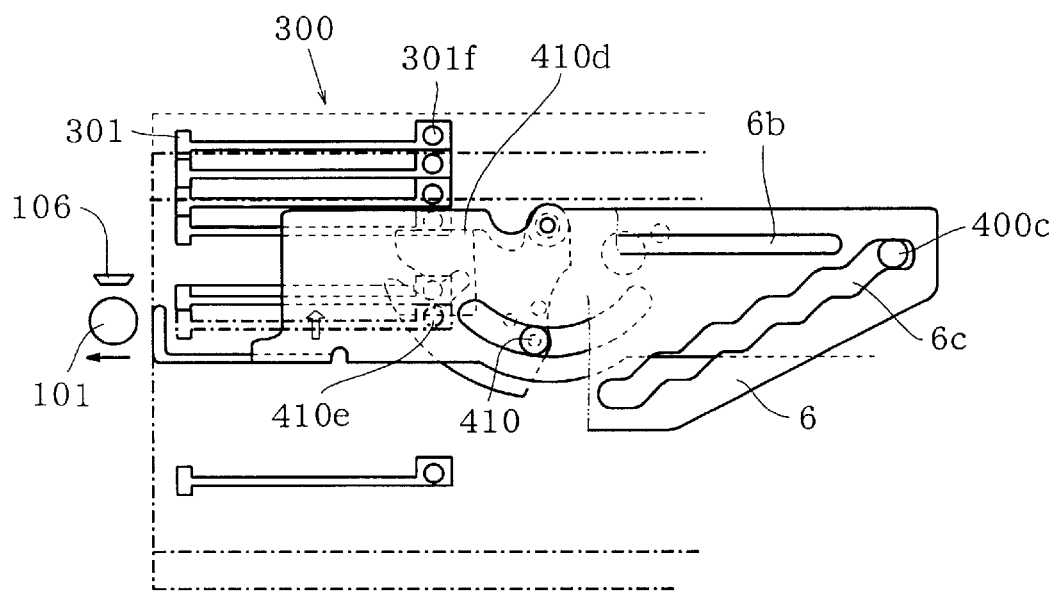

Next, as shown in FIG. 17, the driving roller 101 is moved from the disc carrying position to the retracted position. At that time, the driving roller moves while rotated in the disc feeding direction. Therefore, the disc is not moved to the retracted position. When the driving roller reaches to the retracted position, the disc is released from the roller, so that disc falls on a holding surface 301a (FIG. 2b) of the second tray.

Thereafter, the slide member 6 is moved to lower the movable plate 400. When the pin 400c reaches the second step, the slide member 6 is stopped. Therefore, the plate 400 is positioned at the position shown in FIG. 14. Furthermore, the tray moving member 410 is rotated in the counterclockwise direction so that cams 410d and 410e are released from the projections 301f of the trays.

Next, the slide member 6 is further moved. When the pin 400c reaches the lower most step, the slide member is stopped. Thus, the operation for carrying the disc to the tray finishes.

The operation for discharging disc is the same as the above described operation except the rotating of the driving roller 101 in the disc discharge direction.

The operation for reproducing the disc held on the tray will be described hereinafter.

In the waiting state shown in FIG. 13, when the reproduction of the disc held on the second disc is instructed, the movable plate 400 is raised so that the tray moving member 410 and the disc player 200 are positioned at the second tray.

Next, a space for inserting the disc player 200 is formed between the second tray and the third tray, by the rotation of the tray moving member 410 in the clockwise direction, which operation is the same manner as above description as shown in FIG. 14.

Figure 18:
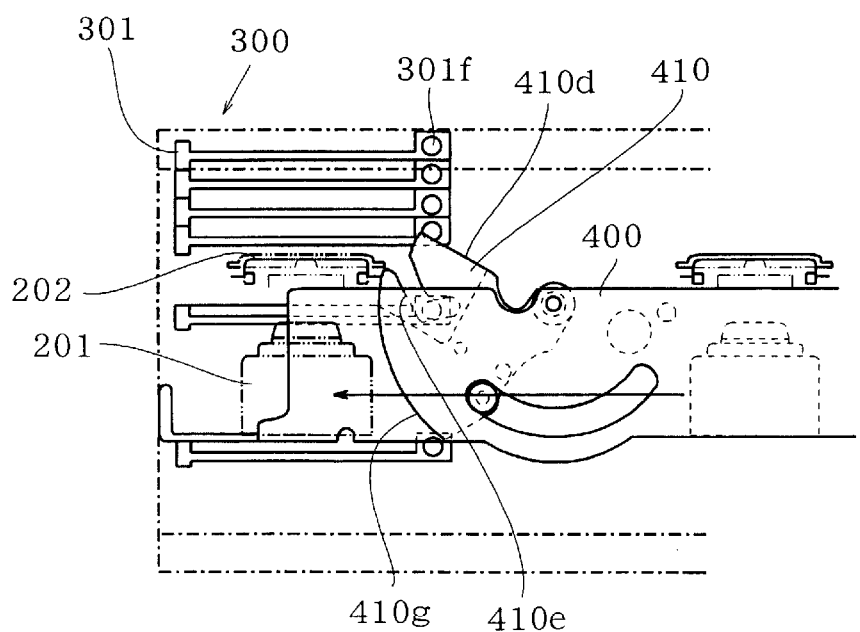

Thereafter, the tray moving member 410 is further rotated in the clockwise direction, so that the third to sixth trays are moreover raised from the position of FIG. 14. At the same time, the second tray is raised by the cam 410f. On the other hand, the first tray is pressed by the outside of the cam 410e, thereby prevented from moving. Thus, as shown in FIG. 18, a large space is formed under the second tray, so that the player 200 can be inserted. The projection 301f of the second tray is deeply inserted in the hole 410c to be held by the tray moving member 410.

Figure 9:
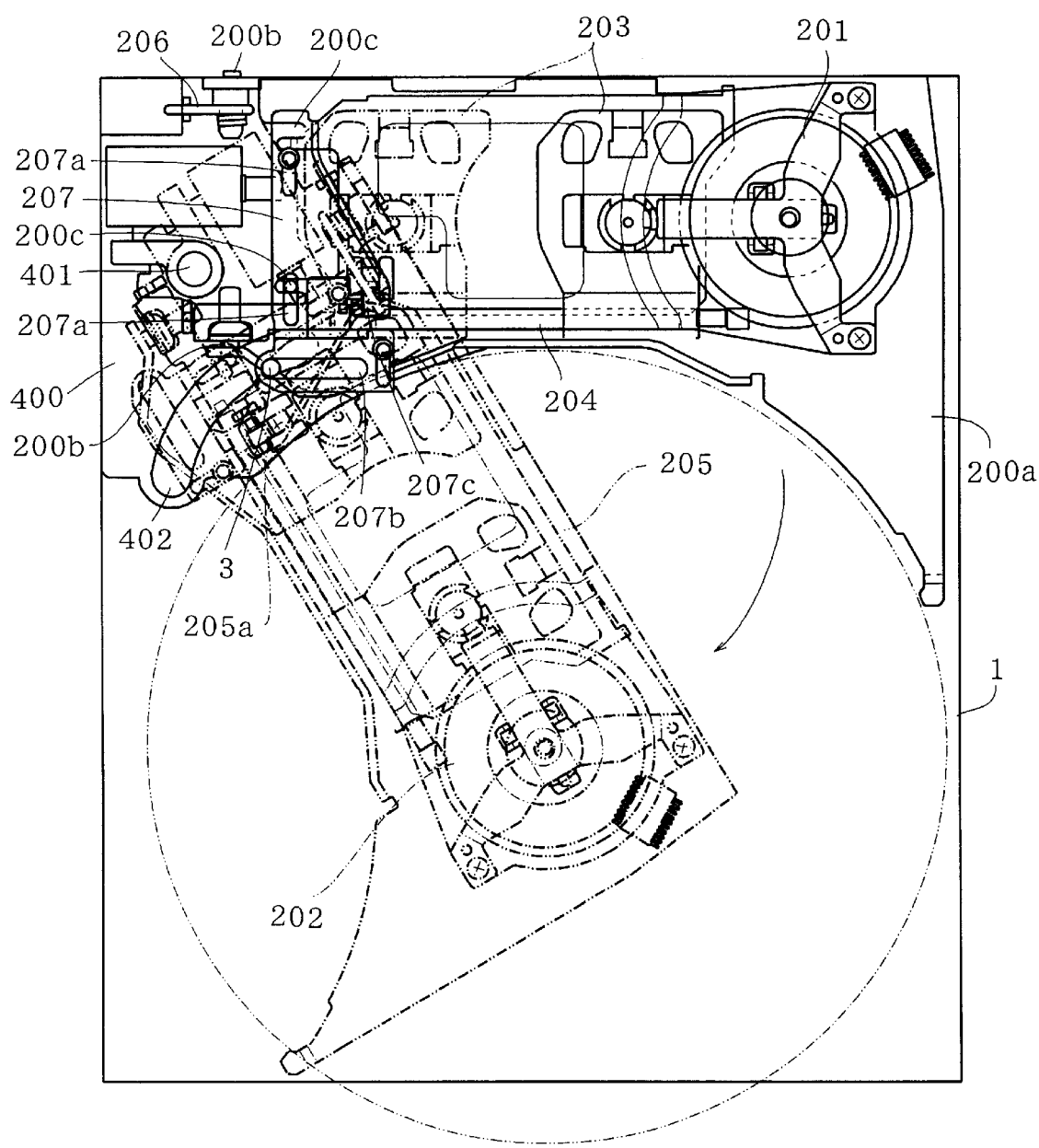
FIG. 9 is a plan view showing the operation of the disc player.
Figure 19:
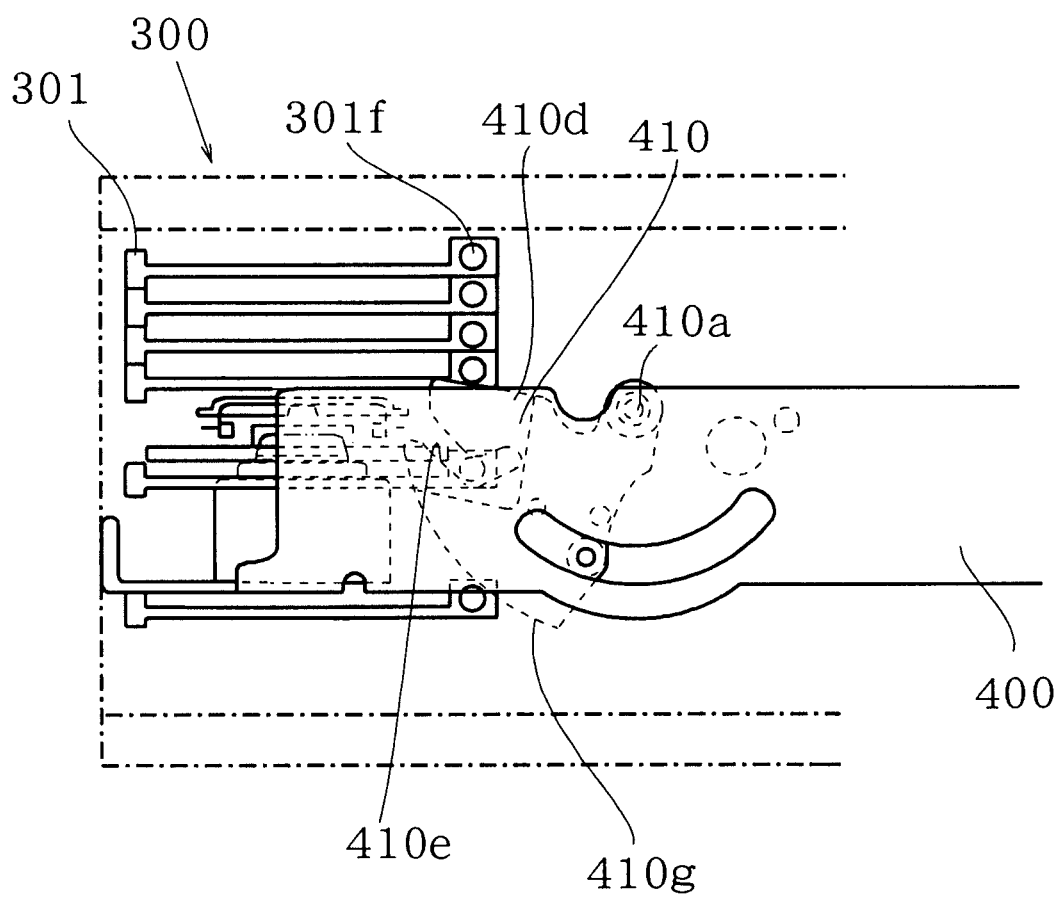
Figure 20:
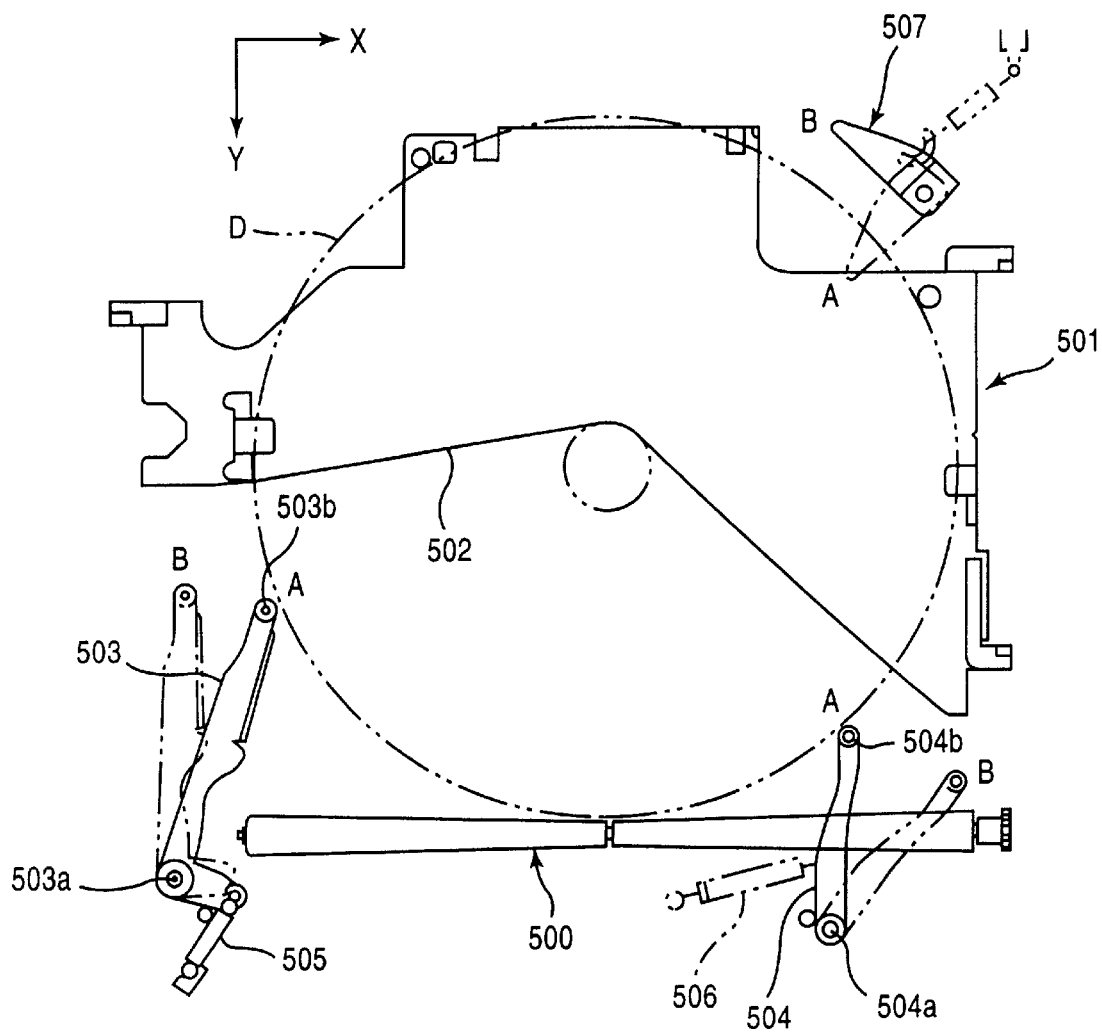
FIG. 20 is a schematic plan view of a conventional disc changer.

Next, the disc player 200 is moved from retracted position to the reproduction position in the above described spaces by the player moving mechanism as shown in FIG. 9. At that time, the clamper 202 and the turntable 201 are separated from each other as shown in FIG. 18. When the player 200 is positioned at the reproduction position, the clamper 202 is lowered to clamp the disc on the turntable 201. At the same time, the tray moving member 410 is slightly rotated in the counterclockwise direction to lower the second tray. Therefore, the disc on the second tray is clamped by the clamper and the turntable as shown in FIG. 19.

In the apparatus of the present invention, there is not provided disc pulling out arms and a disc discharging arm. Therefore, the apparatus is simple in construction and can be manufactured at a low cost.

While the invention has been described in conjunction with preferred specific embodiment thereof, it will be understood that this description is intended to illustrate and not limit the scope of the invention, which is defined by the following claims.

What is claimed is:

1. A disc changer comprising:
   a disc storage in which a plurality of discs are stored in an arranged condition;
   a disc carrier having a pair of driving rollers for carrying a disc inserted from an insertion opening to the disc storage, the pair of driving rollers being separated into both sides of the insertion opening; and
   moving means for moving each of the pair of the driving rollers between a disc carrying position where the driving rollers contact a lower surface of the disc, and a retracted position apart from the disc;
   wherein the disc storage has a plurality of trays arranged in a disc arranging direction, and is provided to be moved in the disc arranging direction, and further comprises a tray moving means for moving the trays in the disc arranging direction, the tray moving means is provided for positioning a desired disc at a height approximately equal to the height of the driving rollers, and wherein the trays have a disc supporting plate, a pair of notches are formed in the disc supporting plate, the driving rollers are provided to be inserted in the notches at the disc carrying position.

2. The disc changer according to claim 1 wherein the driving rollers at the disc carrying position are provided to be engaged with discs in the disc storage.

3. The disc changer according to claim 1 wherein the driving rollers are provided to be parallel with the opening when positioned at the disc carrying position, and to be unparallel at the retracted position.

4. The disc changer according to claim 1 wherein each of the driving rollers is pivotally mounted on a supporting plate at a position adjacent the opening.

5. The disc changer according to claim 1 further comprising means for separating adjacent trays from a desired tray.

6. The disc changer according to claim 1 wherein the driving rollers are provided for carrying a disc inserted from the opening to the disc storage when positioned at the disc carrying position, and provided to be positioned at the retracted position after the disc is stored in the storage.

7. A disc changer comprising:
a disc storage in which a disc is stored;
a disc carrier having a pair of driving rollers for carrying the disc inserted from an opening to the disc storage, the pair of driving rollers being disposed apart from each other on opposite lateral sides of the opening;
moving means for moving each of the driving rollers between a disc carrying position and a retracted position apart from the disc;
wherein a rotational axis of each of the driving rollers in the disc carrying position is parallel to each other, and the rotational axis of each of the driving rollers in the retracted position is unparallel to each other.

8. The disc changer according to claim 7 wherein each of the driving rollers is pivotally mounted on a supporting plate at a position adjacent the opening.

9. A disc changer comprising:
a disc storage in which a plurality of discs are stored in an arranged condition;
a disc carrier having a pair of driving rollers for carrying the disc inserted from an insertion opening to the disc storage, the pair of driving rollers being separated into both sides of the insertion opening, and
moving means for moving each of the pair of the driving rollers between a disc carrying position where the driving rollers contact only one side of the disc, and a retracted position apart from the disc.

* * * * *